United States Patent
Hirota et al.

[15] 3,664,965
[45] May 23, 1972

[54] FORMALDEHYDE-GELATIN COMPOSITION FOR GAS PRESSURE TESTING WHICH FORMS A LONG LASTING FOAM

[72] Inventors: Nobuyoshi Hirota; Yoshio Onoshima, both of Nagasaki-shi, Japan

[73] Assignee: Mitsubishi Jukogyo Kabushiki Kaisha, Tokyo, Japan

[22] Filed: Jan. 28, 1970

[21] Appl. No.: 6,548

Related U.S. Application Data

[63] Continuation-in-part of Ser. Nos. 455,007, May 11, 1965, abandoned, and Ser. No. 712,375, Mar. 12, 1968, abandoned.

[30] Foreign Application Priority Data

May 19, 1964 Japan....................................39/28033

[52] U.S. Cl......................................252/408, 73/40, 106/4, 252/307, 260/29.3, 260/29.4
[51] Int. Cl. ........................................G01m 3/04
[58] Field of Search...................252/408, 307; 73/40; 106/4; 260/8, 7, 29.3, 29.4

[56] References Cited

UNITED STATES PATENTS

| | | | |
|---|---|---|---|
| 3,388,587 | 6/1968 | Hara | 73/40 |
| 2,665,257 | 1/1954 | Potter | 252/307 |
| 2,469,045 | 5/1949 | La Vietes | 252/307 |

OTHER PUBLICATIONS

Rose et al., Condensed Chemical Dictionary, 1950, pages 506, 661 and 686.

*Primary Examiner*—John T. Goolkasian
*Assistant Examiner*—M. E. McCamish
*Attorney*—McGlew and Toren

[57] ABSTRACT

Leak detecting agent for gas pressure testing consisting essentially of an aqueous solution of a coagulating agent present in an amount of 1.8–18 percent by weight of the solution and a foaming agent present in an effective amount to cause the formation of bubbles indicating the site of the leak, the solution also including an addition of an acid in an amount to adjust the pH range of the solution from 3–6, said range promoting hardening of a film formed from the solution upon elimination of water, and preservation of the bubbles in said film for many hours, thus enabling an observer to detect theleakage at a time convenient for inspection.

9 Claims, No Drawings

FORMALDEHYDE-GELATIN COMPOSITION FOR GAS PRESSURE TESTING WHICH FORMS A LONG LASTING FOAM

CROSS-REFERENCE TO PRIOR APPLICATIONS

This is a continuation-in-part of our copending application Ser. No. 455,007, filed May 11, 1965, now abandoned, and copending application Ser. No. 712,375, filed Mar. 12, 1968 now abandoned.

SUMMARY OF THE INVENTION

The detection of leaks in hull structures of ships or in tank structures or other closed vessels has hitherto been accomplished by hydraulic tests. In the case of hull structures, however, the larger compartments presently in vogue require excessive amounts of water as the hydraulic fluid, whereby such hulls tend to become deformed; they are also subject to rusting. These drawbacks, however, are not present in the method of testing by gas as exemplified herein.

The methods of using gas under pressure for leak detection commonly have involved the use of a foaming agent such as soapy water or an agent which, when applied to the vessel, becomes discolored when the escaping gas contains an agent which reacts with the liquid such as ammonia, sulfur dioxide, or the like.

These detection methods have shortcomings such as insufficient reliability, high labor requirements, toxicity or detection gas, impossibility of preserving the gas formed at detected points for a sufficiently long time, or discoloration of applied chemicals by the action of welding flux which may be present.

Among the prior art detection methods using gas bubbles formed at the spot of leakage is one which stresses the purpose of causing the formation of bubbles having the capacity for readily separating from the surface on which they are formed in order to give the observer at a considerable distance an indication of the point of origin. This, as will appear more fully later, is exactly the contrary from the purpose of the present invention where a composition is used for formation of bubbles which will cling to the point of origin for an indefinite time, at least many hours.

It is a principal object of the present invention to provide improved leakage detecting agents for gas pressure testing which eliminate all the foregoing difficulties usually met in carrying out gas pressure tests and which are specifically suitable for, and applicable in a simple manner to gas-pressure leakage tests of large structures such as ship hulls.

Another object of the invention is to provide externally applicable agents for leakage detection in gas pressure tests which are applied to surfaces having pressure leakage points, thereby to produce bubbles of sufficient durability which will cling to the point of origin, whereby inspection may be possible a considerable time after the gas has been used.

Another object of the invention is to provide agents for external application suitable for the above purposes in which the ingredients are present in the proper proportions.

Still other objects and advantages of the invention will become apparent in the course of the following detailed description.

Briefly, the inventive gas leakage detection composition suitable for external application essentially consists of an aqueous solution of a coagulant and a foaming agent.

The coagulant or coagulating agent is contained in the aqueous solution in amounts ranging from about 1.8 to 18 percent by weight. Suitable coagulants are water soluble urea formaldehyde resorcinol formaldehyde resin, cresol formaldehyde resin; also protein, especially gelatin, in particular coarse gelatin having a gelation temperature not exceeding 35° – 40° C.

The foaming agent is preferably used in amounts ranging from about 0.4 to 0.9 percent by weight of the solution. Preferred foaming agents are sodium oleate and sodium linoleate; sodium dodecylbenzene sulfonate, oleyl diethyl ethylene diamine, polyoxyethylene sorbitane monolaurate and polyoxyethylene sorbitane monooleate. The last two mentioned compounds are represented by the formulas

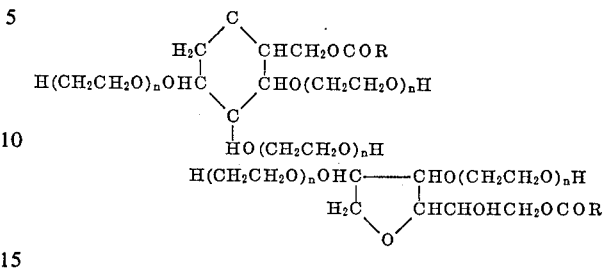

where R stands for the alkyl or olefine radical having 11–17 carbon atoms and is represented by $C_nH_{2n+1}-$ or $C_nH_{2n-1}-$; $n = 5 - 30$.

The sorbitane in the monolaurate is 1,5-sorbitane, or 1,4,3,6-sorbitane, a non-ionic surfactant marketed under the tradename LT–221, by Nippon Oils and Fats Co., Ltd.

The tradename of polyoxyethylene sorbitane monooleate is Nonion OT 221, Nippon Oils and Fats Co., Ltd.

The sodium dodecyl benzenesulfonate used has the formula

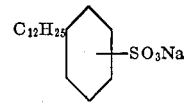

which is marketed in the form of several commercially available preparations known under the tradenames LIPON F103, LIPON LELLO, LIPON P105 and LIPON 106.

In respect to the polyoxyethylene compounds, those of the alkyl-aryl ether type are preferred. They are nonionic surfactants of the formula $R-O-(CH_2CH_2O)_nH$ or

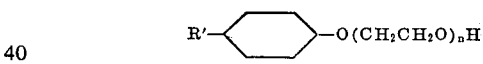

wherein $R = C_{12}-C_{18}$ and $R' = C_8-C_9$. Such products are marketed by Nissan Kagaku Kogyo Kabushiki Kaisha under various tradenames such as NISSAN NONION.

The coagulant and the foaming agent are dissolved in water to form a viscous solution. The proportion of the coagulating agent to the solution, ranging from 1.8 to 18 percent by weight, is preferred because the coagulating agent in an amount of less than 1.8 percent will unduly prolong the coagulation time of the detecting agent and shorten the life of the resulting bubbles, while the coagulating agent in an amount of more than 18 percent will not form a uniform film and will not produce bubbles in a satisfactory manner.

The solution may also contain small amounts of an anti-corrosive and/or antiseptic agent.

Examples of a water-soluble anti-corrosive agent are sodium sulfite, sodium nitrite, potassium chromate, sodium bichromate, or aliphatic amines which may be added to the solution; antiseptics are e.g., formalin, thymol, phenol, pentachlorophenol, salicylic acid, methyl ester salicylate, butyl paraoxybenzoate, dodecyl-hydroxy-imidazoline, boric acid or borax.

A leakage detecting agent prepared according to the invention, when applied with a brush or by a spray or other means to the areas of a structure to be inspected for leakage, produces a bubble or bubbles out of the coated film at a defective point or points where a gas, e.g., air, introduced under pressure into the structure leaks out, said bubble or bubbles being solidified and fixed by hardening due to a chemical reaction of the coagulating agent or to air-dry hardening. The bubble or bubbles formed are long-lasting and are in fact preserved for an indefinite time and, in any event, for several hours, whereby considerable delay may be had between the time the gas is released and the time of inspection.

After evaporation of the water content of the bubble or after chemical reaction, the bubbles become cocoon-like in appearance. Due to the action of the anticorrosive agent present, the surface under the coated layer does not corrode and the presence of the antiseptic enables the composition to be stored indefinitely without spoilage.

According to a further feature of the invention, the pH of the leak detecting solution should be in the acidic range of about 3 – 6. This promotes the hardening of the film formed upon the removal of the water and considerably extends the life of the bubbles. Phosphoric acid and chromic acid are suitable acids for the indicated purpose. In some cases bichromic acid may also be used.

The invention will be further explained with reference to the following specific examples:

EXAMPLE I

A composition was made up as follows, the percentages being by weight:

| | |
|---|---|
| Urea resin solution containing 75% urea-formaldehyde resin | 1.8% |
| Gelatin | 1.8% |
| Foaming agent (dodecyl benzene sulfonate) | 0.9% |
| Water | 91.0% |
| 1/10 phosphoric acid solution | 4.5% |

This was applied to welded parts of a steel tank, and the tank was then placed under pressure somewhat higher than the atmospheric, i.e., 0.5 kg/cm². Thereupon, bubbles formed over the pinholes in the welded parts, which after 10 minutes had gelled completely and had become hard after 2 hours. Thus, the bubbles formed were rendered permanent. The phosphoric acid present promoted hardening of the urea resin and of the gelatin. Together with the alkyl arylsulfonate used as the foaming agent, it served to prevent rusting of the steel structure.

The action of the acid present will now further be explained in detail. First, with respect to the urea resin solution: urea and formaldehyde present in the system react to form methylol urea. This will then condense with the excess formaldehyde present, due to the presence of the acid, to methylene urea, which constitutes a water-insoluble urea resin that will undergo hardening. The acid thus catalyzes the following condensation reaction:

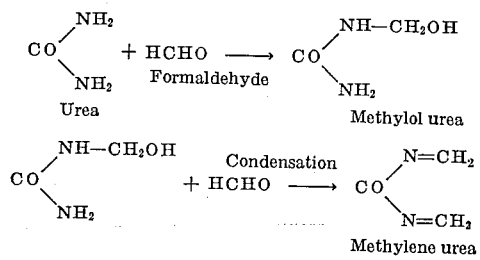

It may be observed that condensation is a reaction generally involving a union between atoms in the same or different molecules with separation of molecules such as $H_2O$, $C_2H_5OH$ and $HCl$ to form a new compound of greater complexity.

Colloidal particles will thus coagulate remarkably well when an acid is added and the isoelectric point is controlled within pH 3 – 6.

Aside from phosphoric acid, the hardening catalyst may be selected from formic acid, oxalic acid, acetic acid, or ammonium chloride or thiocyanate.

While the bubbles formed by the compositions according to the invention are usable at 20° C. for 15 to 20 hours, the service life of the bubbles can be increased or decreased to some extent by adjusting the pH value within the range mentioned from 3 to 6 by addition of the hardening catalyst. If desired, a leaky point may be indicated even more clearly by the addition of a coloring dye or pigment. The urea resin for use in the compositions may be of commercial grade.

The amounts of the resin and gelatin as specified may be increased up to five-fold. The foaming agents useful for the invention include cation surface activators such as sodium dodecyl benzene sulfonate and higher alkyl sulfuric esters, and nonionic surface activators such as sorbitane mono-oleate or polyoxyethylene sorbitane mono-oleate, are all readily available commercially. Sorbitane mono-oleate is a reaction product of the oleic acid and sorbitol in approximately molar amounts; the product is marketed under the names NISSAN METALEX CA No. 1100 and 1110 by Nippon Oils and Fats Co., Ltd.

In Example I, the action of the gelatin, inter alia, accelerates hardening of the urea resin or urea phenol resin formed; the gelatin may, however, be omitted if desired. It may further be stated that the shell of the bubbles is first formed by the gelatin and thereafter further hardened by the action of the acid combined with air-drying.

Of course, gelatin alone can effect hardening, but the resulting bubbles are not sound and stable enough for practical purposes in a highly humid location, where the existing large water content weakens the bubbles. This difficulty is removed by the addition of the synthetic resin.

As regards the temperatures at which gelatin may be used, the range is between −5° C. and +40° C. However, gelatin gells quickly at a temperature lower than 30° C., particularly in winter, and therefore it must be warmed in case of use.

Also, because of the rapid gelling of gelatin at a temperature below 30° C., it is advisable to decrease the amount of gelatin and increase the amount of resin for cold weather use. In other words, the principal constituent of the coagulating agent is a water-soluble synthetic resin and gelatin is used as an assistant coagulating agent.

EXAMPLE II

| A composition of: | By weight |
|---|---|
| Gelatin | 4.5 % |
| Foaming agent (oleyl diethyl ethylene diamine) | 0.45 % |
| Formalin | 2.7 % |
| Water-soluble anti-corrosive mono-octadecylamine | 1.35 % |
| Cresol formaldehyde (as resin) (Tradename Beckacite or Foundrez Japan Reichhold Chemicals, Inc.) | 1.00 % |
| Water | 90.00 % | was applied in the same manner for the same test as in Example I, and similar bubbles were formed as in Example I, with good accuracy in leakage detection. In this composition, the water-soluble anti-corrosive may be replaced by an inorganic salt, e.g., alkali metal salt of sulfurous acid, nitrous acid, chromic acid, or bichromic acid, or by an organic compound such as a higher aliphatic amine, sorbitane mono-oleate, or sorbitane tri-oleate. The foaming agent may be a surface activator of cation, anion or nonionic type, as in Example I.

Among the higher aliphatic amines to be used the following are mentioned for example:

| | |
|---|---|
| Mono-Hexadecylamine | $C_{15}H_{31}CH_2NH_2$ |
| Di-Hexadecylamine | $(C_{15}H_{31}CH_2)_2NH$ |
| Tri-Hexadecylamine | $(C_{15}H_{31}CH_2)_3N$ |
| Mono-Octadecylamine | $C_{17}H_{35}CH_2NH_2$ |
| Di-Octadecylamine | $(C_{17}H_{35}CH_2)_2NH$ |
| Tri-Octadecylamine | $(C_{17}H_{35}CH_2)_3N$ |

Hardening in case of use is accelerated by adding phosphoric acid or chromic acid to the extent that a pH value in the range 3 to 6 is obtained, as described in Example I.

As mentioned above, the leakage detecting compositions of Examples I – II applied in gas pressure leakage tests of steel tanks made it possible to detect leaky points with good accuracy, by forming cocoon-shaped solid film bubbles which were not affected in any way by alkaline flux left in the welds inspected for leakage. When the parts coated with these compositions were left alone at a relative humidity of 75 percent and a temperature of 25° C. for 7 days, they showed no trace of rust, indicating the high anti-corrosive property of the compositions.

As will be understood from the foregoing description, the agents or compositions according to the invention are applied to the parts to be inspected for leakage, and after the gas has been applied and released the inspection of defective parts may be had at a later convenient time with accuracy and certainty, thus resulting in a saving in labor cost inasmuch as the inspection may be delayed to a convenient time. Moreover, the compositions of the invention permit gas pressure tests to be conducted with air, without addition of poisonous gas usually employed. As above stated, the compositions are not influenced by action of alkali in the welding flux remaining in welds. Further, upon application they do not flash or explode. With the many advantages pointed out above, the present invention is extremely valuable from an industrial standpoint, as it is suitable for gas pressure leakage tests of huge hulls on building berths and is generally of wide applicability.

It will be understood that other specific compositions may be used within the spirit of the invention and the scope of the appended claims.

What is claimed is:

1. A composition for detecting leakage of gas when applied to an exterior surface for use in gas pressure testing to cause formation of long lasting bubbles indicating the site of the leak, which comprises an aqueous solution of
   a. a coagulating agent in an amount of from about 1.8 percent to about 18 percent by weight, said coagulating agent consisting essentially of (i) a resin member selected from the group consisting of water-soluble ureaformaldehyde resin, urea phenol formaldehyde resin, resorcinol formaldehyde resin and cresol formaldehyde resin; and (ii) gelatin;
   b. a foaming agent consisting essentially of a member selected from the group consisting of sodium oleate, sodium linoleate, sodium dodecylbenzene sulfonate, sodium dioctyl-sulfosuccinate oleyldiethyl ethylenediamine, polyoxyethylene sorbitane mono-oleate, said foaming agent being present in an amount of from about 0.45 percent to about 0.9 percent by weight of the solution and
   c. an acid selected from (i) phosphoric acid, and (ii) chromic acid, in an amount adapted to adjust the pH range of the solution from about 3.0 to about 6.0, whereby the hardening of the film formed upon elimination of the water from solution is promoted and the bubbles in said film are preserved for many hours, thus enabling the observer to detect the leakage at a time convenient for inspection.

2. The composition according to claim 1, wherein the sorbitane in the sorbitane monolaurate is a member selected from the group consisting of 1,5— sorbitane and 1,4,3,6—sorbitane.

3. The composition according to claim 1, wherein the gelatin is used at a temperature in the range of −5° C. and +40° C.

4. The composition according to claim 1, wherein the coagulating agent consists of at least 1.8 percent by weight of gelatin and at least 1.8 percent by weight of resin member (i).

5. The composition according to claim 1, wherein the coagulating agent consists essentially of (i) 1.8 percent by weight urea resin solution containing urea-formaldehyde, and (ii) 1.8 percent by weight gelatin; the foaming agent is 0.9 percent by weight dodecylbengenesulfonate.

6. The composition according to claim 5 wherein 4.5 percent of phosphoric acid (1/10) solution is used.

7. The composition of claim 1 wherein the coagulating agent consists essentially of (i) 1.0 percent by weight cresol formaldehyde resin and (ii) 4.5 percent by weight gelatin; the foaming agent is 0.45 percent by weight oleyl diethyl ethylene diamine.

8. A leak detecting composition which comprises

| | |
|---|---|
| Gelatin | 4.5% |
| Oleyl diethyl ethylene diamine | 0.45% |
| Formalin | 2.7% |
| Mono-octadecylamine | 1.35% |
| Cresol formaldehyde resin | 1.00% |
| Water | 90.00% | all of said percentages being by weight based on the total composition.

9. A leak detecting composition which comprises

| | |
|---|---|
| urea resin (75% urea formaldehyde) solution | 1.8% |
| Gelatin | 1.8% |
| Dodecylbenzene sulfonate | 0.9% |
| Phosphoric acid solution (1/10) | 4.5% |
| Water | 91.00% | all of said percentages being by weight based on the total composition.

* * * * *